US010831350B1

(12) United States Patent
de Guia et al.

(10) Patent No.: US 10,831,350 B1
(45) Date of Patent: Nov. 10, 2020

(54) HOME CUSTOM SERVICES (71) Applicant: Allstate Insurance Company, Northbrook, IL (US)

(72) Inventors: Nicolette de Guia, Chicago, IL (US); Mark E. Faga, Evanston, IL (US); Moises Norena, Northbrook, IL (US); Ryan G. Campbell, Lake Zurich, IL (US); Surender Kumar, Palatine, IL (US)

(73) Assignee: Allstate Insurance Company, Northbrook, IL (US)

( * ) Notice: Subject to any disclaimer, the term of this patent is extended or adjusted under 35 U.S.C. 154(b) by 1047 days.

(21) Appl. No.: 15/086,834

(22) Filed: Mar. 31, 2016

(51) Int. Cl.
*G06Q 40/08* (2012.01)
*G06F 3/0484* (2013.01)
*H04L 12/28* (2006.01)
*H04L 29/08* (2006.01)
*G06Q 10/00* (2012.01)

(52) U.S. Cl.
CPC ......... *G06F 3/04842* (2013.01); *G06Q 10/20* (2013.01); *G06Q 40/08* (2013.01); *H04L 12/2803* (2013.01); *H04L 67/12* (2013.01)

(58) Field of Classification Search
CPC ... G06F 16/285; G06Q 10/06; G06Q 10/1097
See application file for complete search history.

(56) References Cited

U.S. PATENT DOCUMENTS

| 6,611,807 | B1* | 8/2003 | Bernheim | G06Q 40/02 705/36 R |
|---|---|---|---|---|
| 8,400,299 | B1 | 3/2013 | Maroney et al. | |
| 10,198,771 | B1 | 2/2019 | Madigan et al. | |
| 2007/0067180 | A1 | 3/2007 | James et al. | |
| 2008/0255862 | A1 | 10/2008 | Bailey et al. | |
| 2011/0270773 | A1* | 11/2011 | Siekman | G06Q 10/10 705/305 |
| 2014/0233141 | A1 | 8/2014 | Blemel et al. | |
| 2014/0257862 | A1 | 9/2014 | Billman et al. | |
| 2014/0330594 | A1 | 11/2014 | Roberts et al. | |
| 2014/0358592 | A1 | 12/2014 | Wedig et al. | |
| 2015/0100508 | A1 | 4/2015 | Binion et al. | |

(Continued)

OTHER PUBLICATIONS

Oct. 18, 2017—(WO) International Search Report—PCT/US17/52640.

(Continued)

*Primary Examiner* — Scott S Trotter
(74) *Attorney, Agent, or Firm* — Banner & Witcoff, Ltd.

(57) ABSTRACT

Methods, computer-readable media, systems and apparatuses for generation of a custom user interface for various categories of users and home maintenance, finance, and insurance monitoring are provided. The systems may receive data associated with a home, such as a plurality of systems and/or devices associated with the home. Based on the received information, the systems may generate a maintenance task list for the home including a plurality of maintenance tasks, finance task lists, and/or insurance task lists. Data related to maintenance performed on the home may be received and, based on the received maintenance data, a determination may be made as to whether one or more tasks on the maintenance task list have been completed.

19 Claims, 8 Drawing Sheets

(56) References Cited

U.S. PATENT DOCUMENTS

2015/0193864 A1* 7/2015 Allison ................. G06Q 10/02
                                                        705/5
2016/0161940 A1   6/2016 Max
2016/0180347 A1   6/2016 Greene et al.
2017/0006135 A1* 1/2017 Siebel .................... H04L 67/02

OTHER PUBLICATIONS

Accuracy Assured Home Inspections, LLC, Thome Energy Tune-Up, http://www.accuracyinspections.com/energyaudit.htm, pp. 1-6, obtained off internet Mar. 31, 2016.

Angies List Home Tune-Up, What does your Home Tune-Up include, pp. 1-2, https://www.angieslist.com/tuneup, Obtained off internet Mar. 31, 2016.

Allstate Insurance Company, Guest Insurance Services, https://www.facebook.com/GuestInsuranceServices/posts/790538040994552, p. 1, obtained off internet Mar. 31, 2016.

* cited by examiner

HOME CUSTOM SERVICES

TECHNICAL FIELD

Various aspects of the disclosure relate to computer software and computer networks. More specifically, aspects of the disclosure relate to customizable computer software solutions that customize user interfaces and computer interface displays based on user characteristics, thereby providing customized software and/or data features to users.

BACKGROUND

Computer software is prevalent in everyday life. A vast majority of households own at least one computer, and smartphones are now ubiquitous among adults, young adults, and teenagers. As more applications are developed for these devices, user interfaces become more detailed and complex as additional functionality is added. For example, computers are routinely used to assist with household finances. However, these user interfaces are complex and difficult to learn.

Performing maintenance on a home or other structure is another aspect of household finances by maintaining the value of the property and ensuring the home is in good working order. However, often homeowners or other users are in a position where they cannot focus on the home—for example, spouses of deployed military, young families, disabled homeowners, or older homeowners that simply cannot handle the upkeep of a home. Often such homeowners are unsure of the different types of maintenance tasks that should be performed, or simply do not have the time to self-assess a home, or are unaware of the time period in which the tasks should be completed.

Furthermore, a homeowner or other user may be unaware of financial and insurance options. For example, a family with young children may be unaware of the benefits of starting a college savings plan.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

In view of the above deficiencies in the art, a system in which pre-defined categories of homeowners or third parties may arrange for analysis of a home based on categories to identify a plurality of maintenance tasks and for completing the tasks would be advantageous. Furthermore, a system in which pre-defined categories of homeowners or third parties may arrange for analysis of financial and/or insurance exposures based on categories to identify a plurality of financial/insurance tasks and for completing the tasks would also be advantageous.

Aspects of the disclosure thus relate to identifying the status of a homeowner or user ("user"), identifying at least one pre-defined category based on the status of the user, and utilizing the at least one pre-defined category to generate a custom interface for use by the user to input information which may then be used to identify exposures and/or inadequate coverage related to, for example, home maintenance, finance, and/or insurance. Such input may be used to generate home custom service packages that may include generating task lists, monitoring the completion of such tasks, and/or providing incentives or rewards for encouraging completion of such tasks. In addition to user input, data may be obtained from other sources to ensure all necessary tasks are included.

In certain aspects, based on received information including user input, the system may generate home custom service packages including a maintenance task list for the home including a plurality of maintenance tasks. Data related to maintenance performed on the home may be received and, based on the received maintenance data, a determination may be made as to whether one or more tasks on the maintenance task list have been completed. The home custom service packages may further include incentives or rewards for completion of the maintenance tasks.

In other aspects, based on received information including user input, the system may generate home custom service packages including a task lists associated with financial and/or insurance exposures or inadequacies. A determination may be made as to whether one or more tasks on the finance/insurance task list have been completed. Such determination may be made from further user input or from other sources such as banks, mortgage companies, and insurance companies. The home custom service packages may further include discounts or other incentives to encourage financial planning and/or obtaining adequate insurance.

The user status may include, but are not limited to, retired persons, young families, widowed spouses, families with pets, and military families having a spouse deployed. Pre-defined categories may be developed based on common or likely issues or concerns based on the user status.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
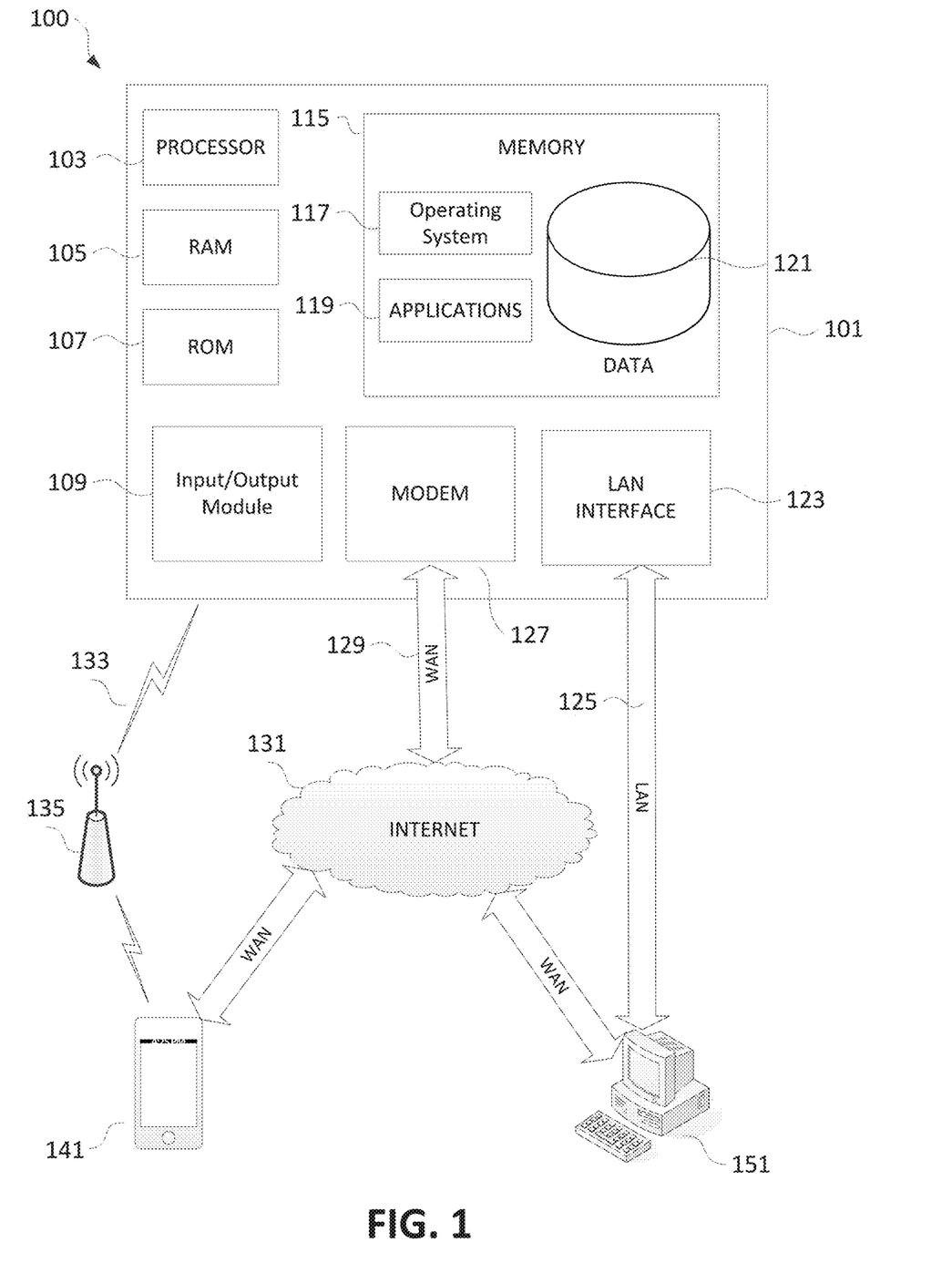
FIG. 1 illustrates computing systems and a network environment that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices described herein, such as personal mobile devices, vehicle-based computing devices, insurance systems servers, home monitoring computing devices, external data sources and other various devices in a home service system. These various computing systems may be configured individually or in combination, as described herein, for identifying at least one pre-defined category of user (homeowner or user groups) based on the user status, creating a custom user interface depending on the at least one category of user, generating home custom service packages including, for example, one or more task lists for maintenance, receiving input regarding progress/completion of tasks on the task list, and, optionally, providing incentives and rewards to promote completion of the tasks, using the devices of the home custom services systems described herein. In addition to the features described above, the techniques described herein also may be used for generating and presenting financial and/or insurance recommendations to customers, financial services, insurance underwriting, and other finance or insurance-related tasks. Further features of the home custom service packages may include providing recommendations of top reliable service providers for completion of tasks and incentives and/or discounts if such service providers are utilized.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within home custom services systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal mobile device 101, vehicle-based device 101, insurance system server 101, home monitoring system/server, etc.), in order to determine a category of user, generate a user interface depending on the category, collect and analyze user data, home system data, maintenance data, determine whether one or more maintenance tasks are completed, etc., using the various devices of the home custom services systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, determine a category of user, creating a custom user interface depending on the category, generate maintenance or other task lists, receive data associated with one or more tasks, and/or determine whether one or more tasks have been completed.

The computing device (e.g., a personal mobile device, vehicle-based system, insurance system server, home monitoring system/server, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), home system monitoring devices, and the like, each of which may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133.

Also illustrated in FIG. 1 is a security and integration layer 160, through which communications are sent and managed between the device 101 (e.g., a personal mobile device, a vehicle-based computing device, an insurance server, an intermediary server and/or external data source servers, home system monitoring device, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a home or associated with a home and home information datacenter or in a cloud infrastructure supporting a cloud-based home system data retrieval and analysis. In other examples, the security and integration layer 160 may correspond to separate hardware and software components which may be operated at a separate physical location and/or by a separate entity.

As discussed below, the data transferred to and from various devices in a home custom services system 100 may include secure and sensitive data, such as confidential home system operation data, insurance policy data, and confidential user data from users associated with a home. Therefore, it may be desirable to protect transmissions of such data by using secure network protocols and encryption, and also to protect the integrity of the data when stored on the various devices within the system, such as personal mobile devices, vehicle-based devices, insurance servers, external data source servers, home system monitoring devices, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., home system data, user data, vehicle data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a home system data and/or user data analysis web service, a home custom services determination or offer web service, or the like, may be implemented in the security and integration layer 160 using the Secure Sockets Layer (SSL) or Transport Layer Security (TLS) protocol to provide secure connections between servers 101 and various clients 141, 151, and 161. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of home system data, user data, user behaviors or characteristics, account balance data, etc.) is cached in a separate smaller database on an application server separate from the database server (e.g., at a personal mobile device, home system monitoring device, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of home custom services systems, such as faster response times and less dependence on network conditions when transmitting and receiving home system information, user information, account information, reward information and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in home custom services system components described herein may be configured to communicate using any of these network protocols or technologies.

Additionally, one or more application programs 119 may be used by the various computing devices 101 within a home custom services system 100 (e.g., home system data and/or user data analysis software applications, insurance parameter determination software applications, reward generating applications, etc.), including computer executable instructions for determining a category of user, creating a custom user interface depending on the category of user, receiving and analyzing various home system data and/or user data, determining maintenance or other task lists, determining whether one or more maintenance or other tasks have been completed, using the devices of the home custom services systems.

Figure 2:
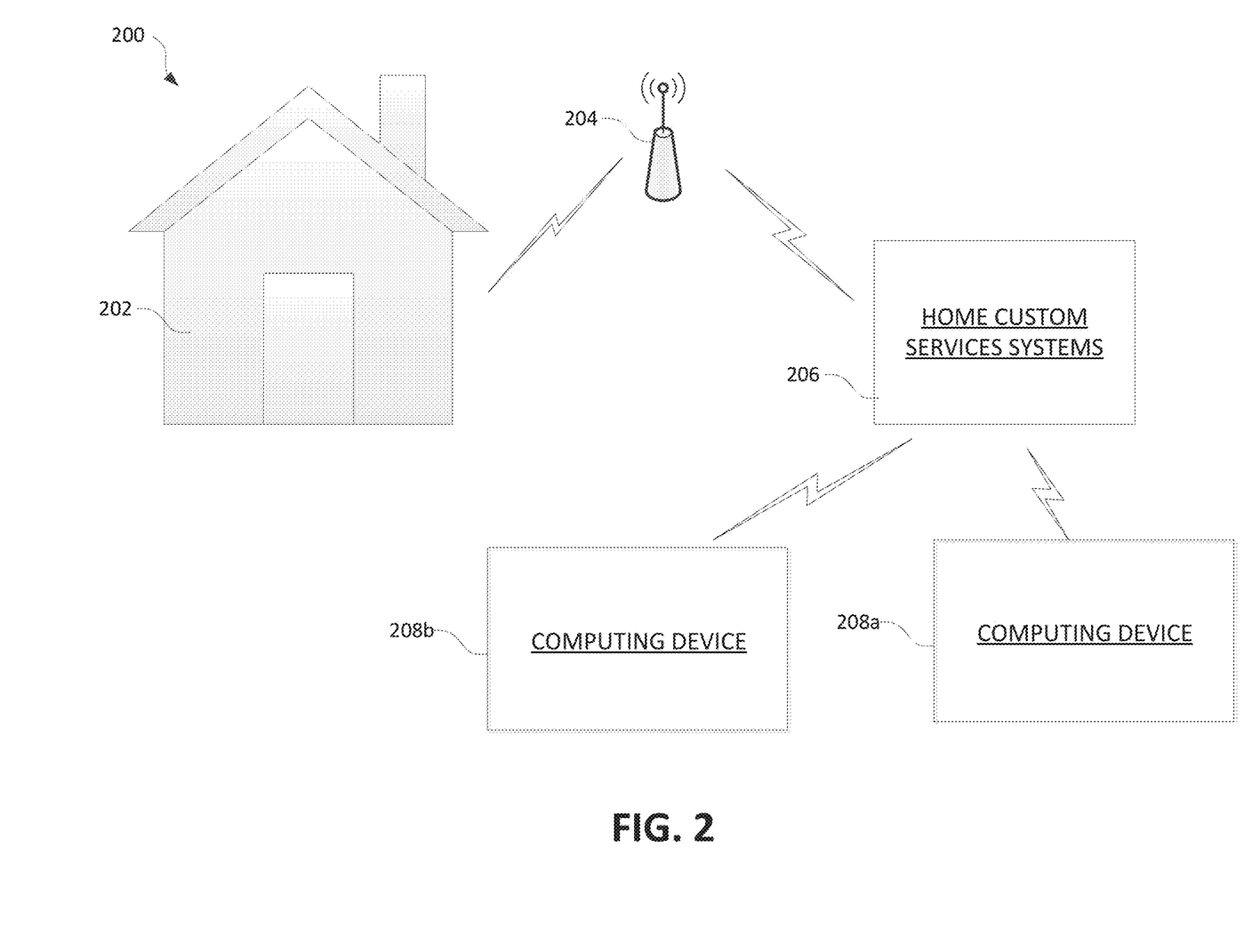
FIG. 2 is an example home custom services system environment illustrating various communications between a home (e.g., home systems, devices, etc.), one or more computing devices, and the home custom services system, according to one or more aspects of the disclosure.

FIG. 2 is a schematic illustration of a home custom services system arrangement according to one or more aspects described herein. For example, such arrangement may be used in conjunction with the input received from a user to prepare home custom service packages or to monitor progress of task lists generated as part of the home custom service packages. As shown in FIG. 2, the arrangement 200 may include a home 202. The home 202 generally includes a variety of systems, appliances, features, and/or devices that may require maintenance or periodic replacement. Some example systems may include (but are not limited to) a roof, driveway, sidewalk, gutters, windows, siding or other exterior covering, appliances, such as a dishwasher, washing machine, dryer, refrigerator, stove, etc.), plumbing, heating/air conditioning (HVAC) systems, sump pump, electrical systems, and the like. These systems, appliances, features, devices, etc., may be monitored (e.g., either automatically by one or more sensing devices and/or manually by a user) to ensure efficient performance, proper functioning, etc. For instance, one or more sensors or sensing devices may be arranged on or integrated into devices such as hot water heaters, refrigerators, washing machines, dryers, furnaces, air conditioning units, windows (e.g., to detect breakage), pipes (e.g., to detect leakage), utilities or utility meters, such as gas, water, and electric, and the like. In some examples, sensors or other monitoring devices may be arranged on or integrated into paint, bricks, roofing, or other building materials, and the like. Other home devices may include sensors or be monitored without departing from the invention. Additionally or alternatively, a user may observe one or more systems, appliances, devices, etc. to determine whether the object is functioning properly.

In some examples, various types of sensors may be used with the sensing and/or monitoring system. For instance, power sensors, moisture sensors, heat or smoke sensing devices, motion sensors, presence sensors, and the like, may be used. In still other examples, "smart" materials may be used, such as smart paints, smart bricks, and the like, that may provide indications of wear or potential failure.

The home 202 depicted in FIG. 2 may include a plurality of appliances and/or systems and one or more of the appliances and/or systems (e.g., devices) may be monitored by one or more sensing devices, users, entities, etc., as will be discussed more fully below. Signals from the one or more sensing devices may be transmitted to the home custom services system 206 at an entity, such as a monitoring service, insurance provider, computer server, or the like. In some examples, the signals may be wirelessly transmitted and may be transmitted to a base collection unit 204 prior to transmission to the system 206. Alternatively, the signals may be transmitted directly to the system 206, e.g., via wired or wireless means. In some arrangements, the data may be collected in real-time and/or transmitted in real-time or near real-time. Additionally or alternatively, the data may be collected and/or transmitted in batches.

In some examples, home custom services system 206 may receive data associated with the home 202. The data may include home maintenance data (e.g., from one or more sensing devices, a user, etc.) and/or general data associated with the home, such as age of home, building materials used in the home, type and age of appliances within the home, and the like. Information associated with the user or owner of the home may also be received by the system 206. Accordingly, the home custom services system 206 may determine, based on the received information, a maintenance plan and/or maintenance task list for the home. The maintenance plan may be based on features particular to the home (e.g., age, type of materials used, appliances, systems, etc.) as well as aggregated data for similar structures or similar systems (e.g., insurance claim data).

In some examples, the maintenance plan and/or maintenance task list may be transmitted to a computing device, such as computing device 208*a* or 208*b*, referred to collectively as computing device 208. Computing device 208 may be one or more user computing devices (e.g., laptop, tablet, smart phone, etc.) and may be configured to display the task list as well as various other features and/or aspects discussed herein.

The home custom services system 206 may receive operation and/or maintenance data (e.g., from one or more sensing devices, from user computing device 208, etc.) and may track the maintenance or repairs/replacements performed on the home. Accordingly, as items on the generated task list are completed, they may be marked completed by the system and completion of one or more items on the task list may generate rewards points for a user. That is, completion of one or more tasks on the task list may result in, for example, a reward or discount on services.

Figure 3:
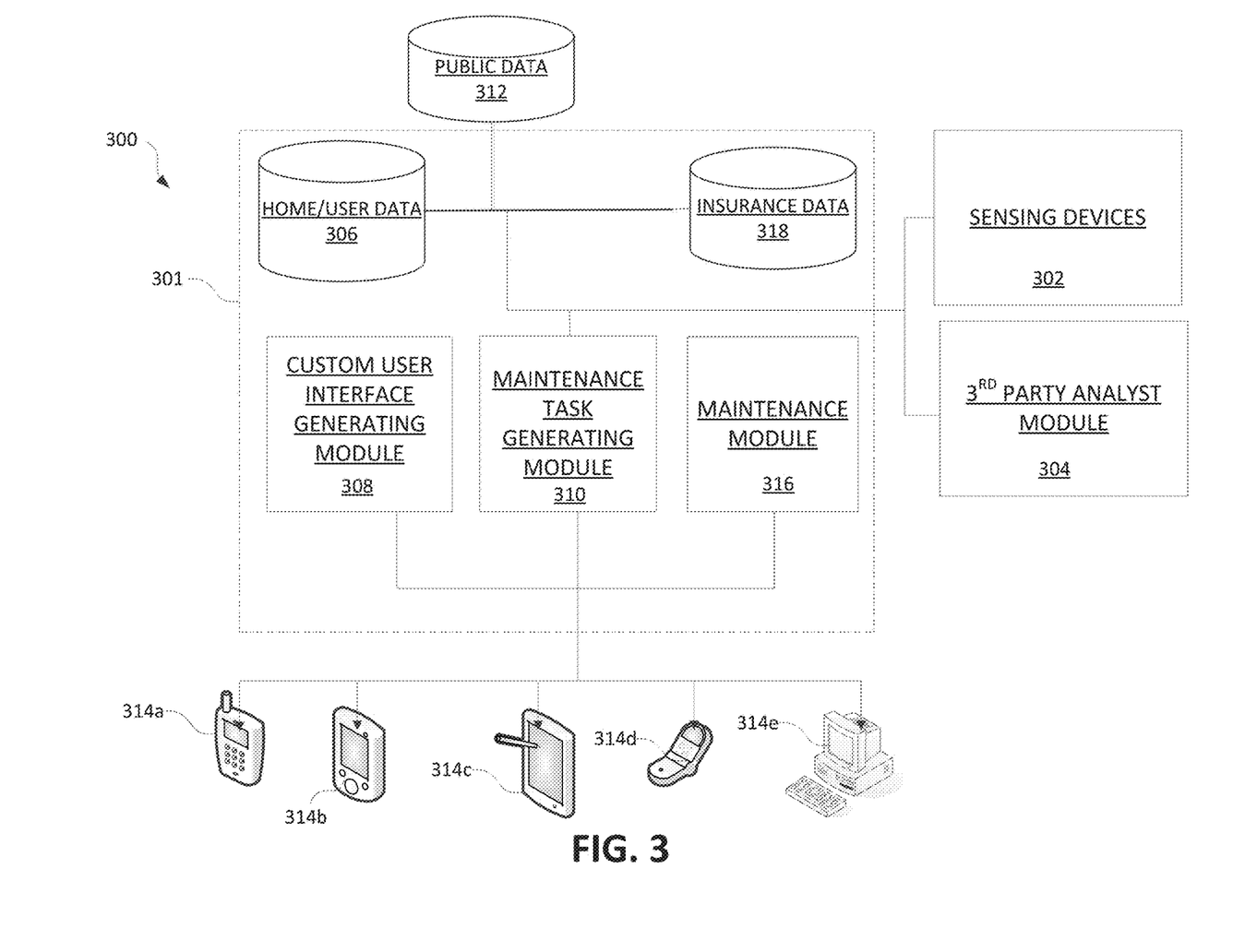
FIG. 3 is an example service system according to one or more aspects of the disclosure.

FIG. 3 is a schematic diagram of an illustrative home custom services system 300 (e.g., system 206 from FIG. 2). The home custom services system 300 may be associated with, internal to, operated by, or the like, an entity 301, such as a home services company, an insurance provider, or other monitoring service or system operator. In some examples, the entity may be one of various other types of entities, such as a government entity, corporation or business, university, or the like. Various examples described herein will be discussed in the context of an insurance provider. However, nothing in the specification should be viewed as limiting use of the systems, methods, arrangements, etc. described herein to use only by an insurance provider.

The home custom services system 300 may include one or more modules that may include hardware and/or software configured to perform various functions within the system

300. The one or more modules may be separate, physical devices or, in other examples, one or more modules may be part of the same physical device. Further, each module may include specific hardware and/or software configured to perform various functions within the system 300, as will be discussed more fully below.

The home custom services system 300 may include a custom user interface generating module 308. The custom user interface generating module 308 may include hardware and/or software configured to perform various functions within the system 300. For instance, the custom user interface generating module 308 may receive data associated with the status of a user. The status of the user may include, for example, marital status, military status, age status, medical status, retirement status, and/or offspring status. Such status may include, for example, information regarding deployment of a spouse or other member of the family, disabilities of the homeowner, ages of children or elderly living with homeowner, and/or long term absences by the user. Based on the status of the user, the custom user interface generating module will identify pre-defined category or categories of homeowner or user groups. Based on the pre-defined categories, the custom user interface generating module 308 may then create a custom user interface for the user to access and respond to. Such custom user interface would include questions and requests for information tailored to the user's status and identified at least one pre-defined category. For example, if a spouse is deployed, information regarding when the spouse is anticipated to return, what tasks or types of tasks the deployed spouse usually handled, what tasks or types of tasks the at home spouse could handle, what tasks or types of tasks can wait for the returning spouse, what tasks or types of tasks should be outsourced. Similarly, if the user is a recent widow or widower, information regarding what tasks or types of tasks the deceased spouse usually handled, what tasks or types of tasks the widowed spouse could handle, what tasks or types of tasks should be outsourced. Tasks may include, for example, mowing the lawn or lawn services in general, changing a lightbulb or electrical matters in general, plumbing, replacing appliances, and the like.

The home custom services system 300 may include a maintenance task generating module 310. The maintenance task generating module 310 may include hardware and/or software configured to perform various functions within the system 300. For instance, the maintenance task generating module 310 may receive data associated with a home and/or user. The data may include types of systems and/or devices within the home (e.g., list of appliances, list of systems/features, etc.). The received data may further include make and/or model of appliances, age of system/device, type of material(s) used in building, etc. The received information may further include information associated with the user or owner of the home (e.g., name, contact information, insurance information, etc.). The data may be received from various sources including a home/user data base 306 (which may include information from one or more insurance sources), one or more publicly available sources 312 (e.g., publicly known information about certain systems or devices), and/or from user input received via one or more computing device, such as computing device 314a-314e.

Accordingly, the maintenance task generating module 310 may generate a maintenance plan for the home including one or more maintenance tasks. The maintenance tasks may be generated based on the received information associated with the home and information aggregated from various other homes and/or structures, similar systems, devices, etc. For instance, the system may receive aggregated data associated with one or more insurance claims (e.g., as received by the entity 301) from a data base, such as insurance data base 318. The information may include data associated with type of device or system, age, type of repairs, usage time before replacement, wear factors associated with building materials, and the like. By comparing the systems, devices, etc. associated with the home with the aggregate data for similar systems and/or devices, the maintenance task generating module 310 may identify one or more maintenance tasks that should be performed. Some examples of maintenance tasks may include replacement of a roof, replacement of a water heater, sewer cleaning, window replacement, refrigerator replacement, and the like. In some examples, the maintenance task generating module 310 may also prioritize the generated tasks (e.g., based on urgency, best return on investment, etc.).

In some examples, the maintenance task generating module 310 may also generate a time period in which the task should be performed. For instance, if a failure may be imminent, the maintenance task generating module 310 may determine that the task should be completed in a relatively short time period. In other examples, early signs of wear may be showing on a system or device and so a longer time period may be suggested for completing the maintenance task.

Once a maintenance task list has been generated, the list may be transmitted to a user, such as via one or more computing devices 314a-314e. For instance, the task list may be transmitted to a smart phone 314a, personal digital assistant (PDA) 314b, tablet 314c. cell phone 314d, or other computing device 314e, of the user. In some examples, the other computing device may include a vehicle on-board computing device and the task list may be displayed to the user via a display within the vehicle and/or may be provided via an audio transmission within the vehicle.

The home custom services system 300 may then monitor the various systems and/or devices associated with the home. Monitoring of the systems and or devices may be performed automatically, such as via data received from one or more sensing devices, and/or manually, such as via data received from a user associated with the home (e.g., user reporting of maintenance performed via one or more computing devices 314a-314e).

For instance, the home custom services system 300 may include at least one sensing devices 302. The sensing devices 302 may be a variety of types of devices and may be used to monitor or sense one or more characteristics of a system, appliance, feature, device, etc. within a home. For instance, the sensing devices 302 may include float switches, moisture sensors, power sensors or monitors, wear indicating devices, speed sensors, motion sensors, smoke or heat sensors, breakage sensors, cameras, proximity sensors, presence sensors, and the like. In other examples, the sensing devices 302 may include devices for sensing temperature, sewage backup, natural gas, propane, etc., air quality (e.g., carbon monoxide, etc.), air flow quality, water flow, and the like. The sensing devices may include one or more video monitoring devices such as security or other video cameras, live video feeds, and the like, that may receive and/or transmit video or other image data related to one or more appliances, systems, etc. In some examples, devices providing video monitoring or video feed may be monitoring the premises on a periodic or continuous basis. In some arrangements, the devices providing video monitoring or video feed may be in communication with one or more other sensing devices and may activate or begin monitoring, providing video feed, etc. upon an indication received from the one or more other sensing devices. Various other types of sensing devices and/or characteristics may be monitored via sensing devices 0302.

In some arrangements, one or more of sensing devices 302a-302c may be connected to or in communication with one or more home devices, such as appliances, systems, etc., to monitor one or more characteristics of the home device. For instance, home devices or systems such as a water heater, sump pump, roof, attic (e.g., air flow in attic), washing machine, dryer, dishwasher, refrigerator, freezer, air conditioner, furnace, windows, pipes, occupancy, and the like, may be monitored to determine operating condition, whether repair or replacement is needed, whether repair or replacement has been performed (e.g., by an improvement in operating characteristics) etc. Various other appliances and/or systems may be monitored without departing from the invention.

The system 300 may include as many sensing devices as necessary or desired without departing from the invention. Further, in some examples, each sensing device may be a different type of device and/or may be configured to monitor different characteristics of the home device (e.g., one sensing device 302 detects moisture while another sensing device 302 detects power consumption). Additionally or alternatively, each sensing device 302 may be connected to or in communication with a different home device, or multiple sensing devices 302 may be connected to or in communication with a single home device such that multiple, different characteristics of the home device are being monitored (e.g., simultaneously). This may permit additional and/or more accurate information to be collected about the home device. Various combinations of the above-described arrangements may also be used without departing from the invention.

Signals and/or data from the sensing devices 302 may be received by the home custom services system 300. For instance, signals, video feed, and/or data may be transmitted from the sensing devices 302 to the system 300 via wired or wireless transmission. In some examples, the data and/or signals may be transmitted to a base unit for collection prior to transmission to the system 300 or entity 301 associated with the system 300. In other examples, the data and/or signals may be transmitted directly from each sensor 302 to the system 300 or entity 301.

The signals and/or data from the sensing devices 302 may be received by a maintenance module 316. The maintenance module 316 may be connected to or in communication with the sensing devices 302, as well as other modules within the system 300, and may include hardware and/or software configured to perform specific functions within the system. For instance, the maintenance module 316 may be configured to receive data from sensors 302, as well as user reported maintenance data from one or more computing devices 314a-314e, and determine whether one or more tasks on the generated maintenance task list have been completed. Received data that may be used to determine whether a task is completed may include an indication that a system or device has been repaired/replaced (e.g., user input providing confirmation that a system/device has been repaired/replaced), sensor data indicating an improvement in operating conditions (e.g., a system or device was operating outside an expected performance range and is now operating within range and therefore the repair/replacement has been completed), and the like.

Figure 4:
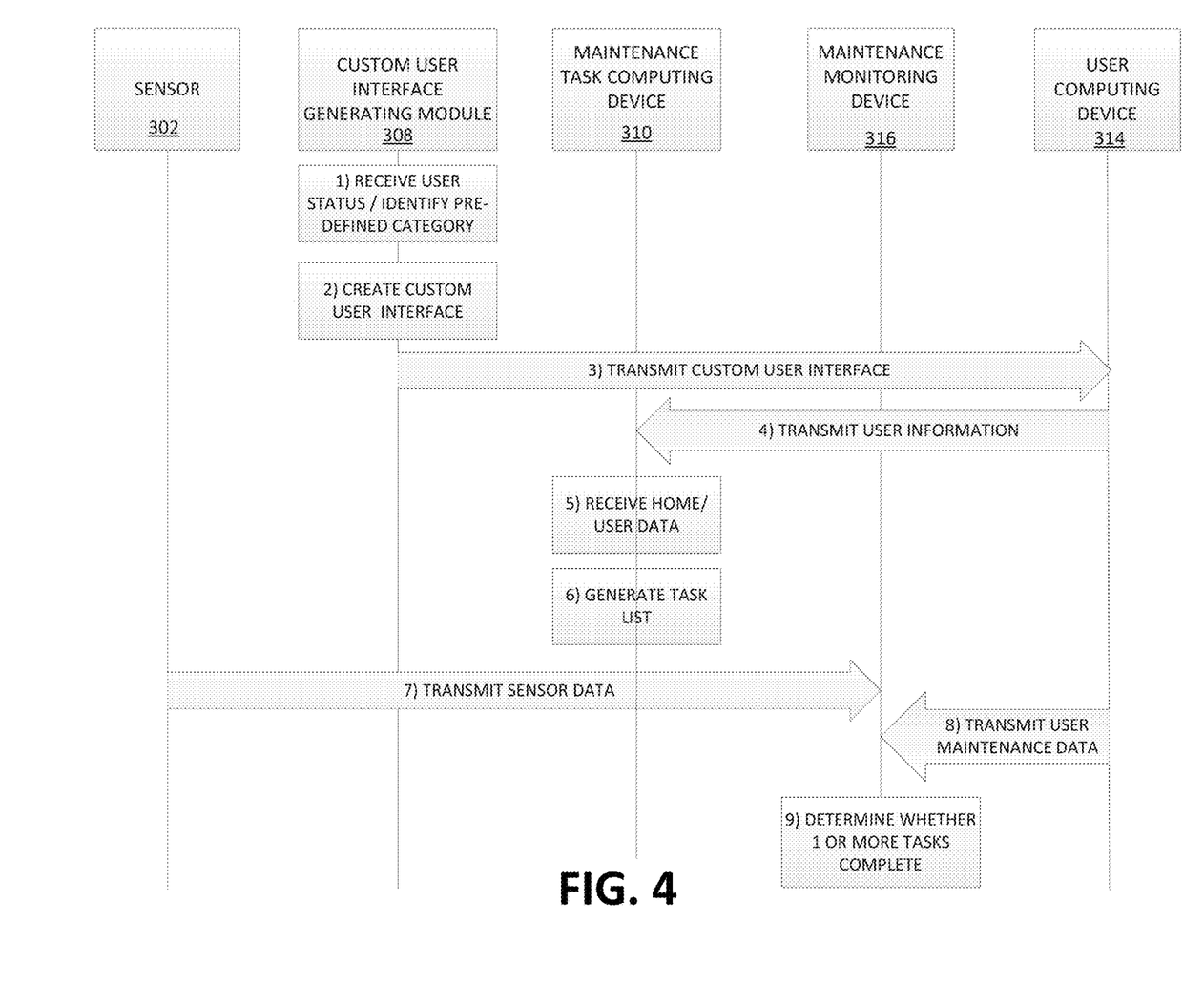
FIG. 4 is an example event sequence illustrating a process associated with the home service system, according to one or more aspects of the disclosure.

FIG. 4 depicts an illustrative algorithm and event sequence for utilizing the home custom services system in accordance with one or more aspects discussed herein. The example shown in FIG. 4 is merely one example sequence and various other steps, processes, or the like, may be included in an algorithm or sequence without departing from the invention.

In step 1, custom user interface generating module 308 receives information regarding status of a user and identifies at least one pre-defined category based on such status. In step 2, the custom user interface generating module 308 generates a custom interface for communication with the user based on the user status and the at least one pre-defined category. The custom interface is generated to focus on, for example, probable needs of the particular user based on the user status and at least one pre-defined category based on such status. For example, if the user has children and a deployed spouse, the module 308 may include questions regarding the age and skills of the children to see if an older child can mow the lawn or whether a lawn service is suggested.

In step 3, the custom user interface is transmitted to, or made accessible from, the user computing device for the user to access and complete the questions tailored to the user. User input in response to the questions posed in the interface may be received from a personal computing device (for example 208a of FIG. 2). In some examples, the questionnaire may be displayed on the user computing device 208a via an application downloaded or otherwise provided to the device (e.g., from home customs service system 101). The application may execute on the user computing device 208a to display questions and receive user input in response to the questions. In some arrangements, the application might not be downloaded to the device and instead may execute on the home custom services system 101 which the user may access via an online system associated with the insurance provider, or the like. In some examples, the request may be received via a telephone system and transmitted directed from the telephone to the insurance request processing device.

In step 4, the data based on user input received by a user computing device 314 in response to the questions posed are transmitted to the maintenance task computing device 310. The data may include types of systems and/or devices within the home, ages of the devices and/or systems, materials used in building the home, user name, contact information, insurance policy information, and the like.

In step 5, additional data may be received from other sources such as third parties having relevant knowledge such as insurance companies, information received from inspection of the home by a qualified person, and/or information from utility companies regarding consumption of resources such as water or power.

In step 6, a maintenance task list may be generated by the maintenance task generating device. The maintenance task list may include a list of tasks, as well as a prescribed time frame for completion of each task.

In step 7, sensor data may be transmitted from one or more sensing devices, such as sensing devices 302 to a maintenance monitoring device, such as maintenance module 316 in FIG. 3. In step 8, User maintenance data may be transmitted from one or more user computing devices 314 to the maintenance monitoring device in step 68.

Upon receipt of the sensor data and/or user maintenance data, the maintenance monitoring device 316 may determine whether one or more tasks on the generated task list have been completed in step 9. As discussed above, the determination regarding completion of the task may be based on user input indicating that a task is complete, and/or based on sensor data indicating an improvement in performance of the system or device. That is, if a device was previously operating outside of a desired operating range based on sensor data (e.g., power usage, water usage, or the like), and the device is not operating within the desired range according to received sensor data, a repair or replacement of the device was likely performance and, accordingly, an associated maintenance task may be marked complete.

Included within the framework of the home custom services may be discounts for reputable service providers to complete one or more of the tasks as well as incentives or rewards for completing tasks. For example, installation of smoke detectors may result in a reduction in home owner's insurance.

Figure 5:
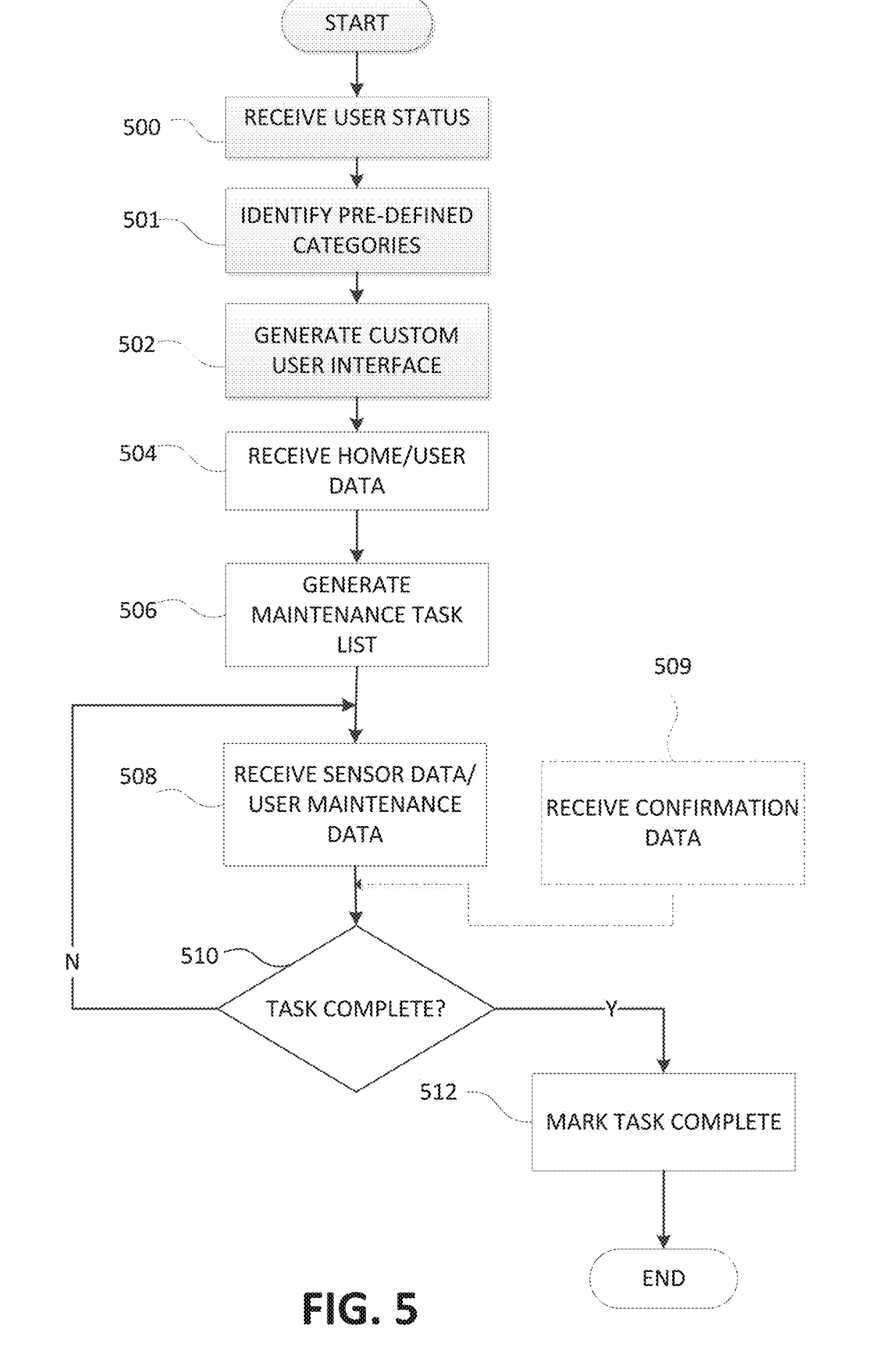
FIG. 5 is a flow diagram illustrating one example method of creating a custom user interface, generating a maintenance task list, and determining whether one or more tasks have been completed, according to one or more aspects of the disclosure.

FIG. 5 illustrates one example method and algorithm for generating a custom user interface, generating a maintenance task list, and determining whether one or more maintenance tasks have been completed. In step 500, user status information may be received from the system. Such status may include, but is not limited to, age, marital status, military status, health status, disability status, children status, and/or retirement status. In step 501, at least one pre-defined category is identified based on the user status. In step 502, a custom user interface is created based on the status of the user and the at least one pre-defined category. For example, if family status includes young children, the custom interface may generate questions and provide information regarding child proofing the house. If the military status includes a deployed spouse, the interface may generate questions regarding tasks the deployed spouse handled. There may be more than one pre-defined category identified based on the status of the user. For example the user status may indicate both a family of young children and a military family having a deployed spouse. Hence the custom interface will generate questions based on both pre-defined categories.

In step 504, home and/or user data may be received by the system. The home and/or user data may include, for example, types of systems or devices, age of systems/devices, building materials used, insurance information, and the like. In step 506, a maintenance task list may be generated for the home/user. The maintenance task list may include one or more recommended maintenance tasks, as well as a recommended time period in which to complete the maintenance task.

In step 508, maintenance data may be received. In some examples, the maintenance data may include data received from one or more sensing devices associated with a system or device within the home. Additionally or alternatively, the maintenance data may include maintenance data provide by a user (e.g., via a user computing device). In optional step 509, confirmation of task completion may be received. For instance, a contractor or service provider (e.g., performing the maintenance) may transmit an indication (e.g., from a system or computing device of the service provider in communication with the home custom services system) that maintenance has been performed/completed.

In step 510, a determination may be made as to whether one or more tasks have been completed. If not, the system will return to step 508 to receive additional maintenance data. If one or more tasks have been completed, the task may be marked complete in step 510.

In addition to the steps outlined, the custom home services may provide any form of incentives, rewards, and/or discounts in working on or completing a task. For example, the custom home services may provide lists of reputable service companies which provide their services at a discounted rate. Completion of tasks may result in lower insurance rates or points that can be collected and used for discounts or products.

Figure 6:
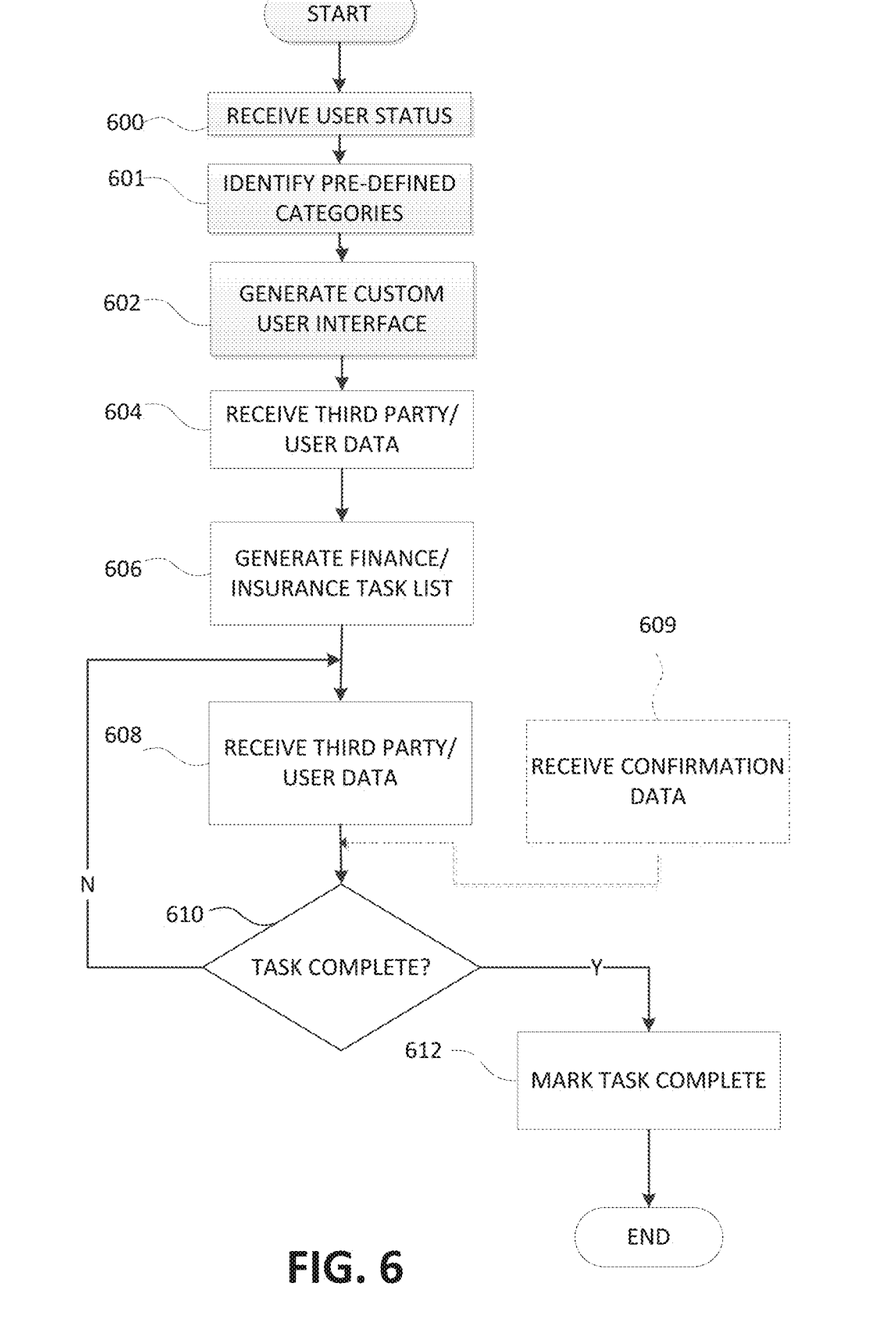
FIG. 6 is a flow diagram illustrating one example method of creating a custom user interface, generating a task list for finance/insurance needs, and determining whether one or more tasks have been completed, according to one or more aspects of the disclosure.

FIG. 6 illustrates another example method and algorithm for generating a custom user interface, generating a finance/insurance task list, and determining whether one or more tasks have been completed. In step 600, user status information may be received from the system such as, but not limited to, age, marital status, military status, health status, disability status, children status, retirement status. In step 601, at least one pre-defined category is identified based on the user status. In step 602, a custom user interface is created based on the status and the at least one pre-defined category. The custom interface may focus on concerns for the particular status. For example, if family status includes young children, the interface may generate questions and information regarding a college savings plan. If the military status includes a deployed spouse, the interface may generate questions regarding disability and/or life insurance policies to ensure sufficient coverage. There may be more than one pre-defined category identified based on the status of the user. For example the user status may indicate both a family of young children and a military family having a deployed spouse. Hence the custom interface will generate questions based on both pre-defined categories.

In step 604, third party and/or user data may be received by the system. The third party data may be information obtained from banks, insurance companies, mortgage companies and the like. User data may information regarding savings, expenses, insurance coverage, and the like. In step 606, a finance/insurance task list may be generated for the user. The maintenance task list may include one or more recommended maintenance tasks, as well as a recommended time period in which to complete the maintenance task.

In step 608, data may be received. In some examples, the data may include data provided by a user (e.g., via a user computing device). In optional step 609, confirmation of task completion may be received. For instance, a bank or insurance provider (e.g., providing a service) may transmit an indication (e.g., from a system or computing device of the provider in communication with the home custom services system) that the task has been performed/completed.

In step 610, a determination may be made as to whether one or more tasks have been completed. If not, the system will return to step 608 to receive additional data. If one or more tasks have been completed, the task may be marked complete in step 610.

Figure 7:
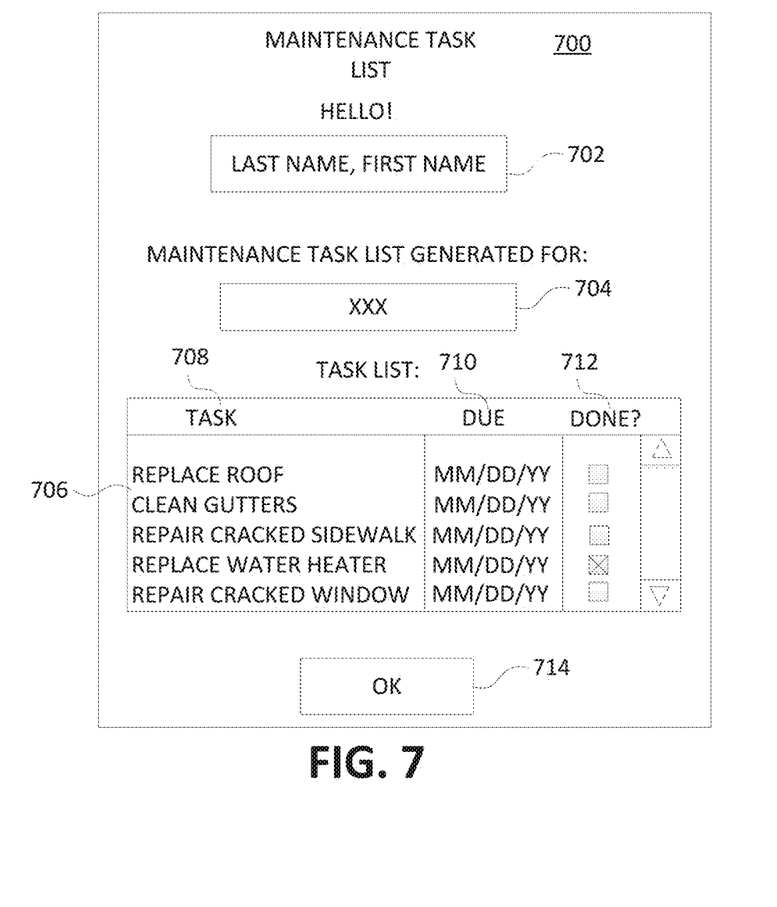
FIG. 7 is one example user interface for displaying an example maintenance task list according to one or more aspects of the disclosure.

FIG. 7 illustrates one example user interface (in wireframe format) displaying a generated maintenance task list according to one or more examples discussed herein. The user interface 700 includes field 702 in which a user is identified, and field 704, in which the home or structure associated with the maintenance task list is identified. Interface 700 further includes the generated task list in field 706. The task list includes a column identifying tasks generated for the particular home or structure in column 708. Column 710 provides a recommended completion date (e.g., if completed by recommended date additional rewards and/or points may be generated for the user). Column 712 includes an identification of whether the task has been completed. For instance, task list 706 indicates that the water heater has been replaced. Completion of the task may be determined by received sensor data and/or user input, as discussed herein. Additionally or alternatively, a contractor or other professional service provider performing the repair/replacement or providing parts, or other services, may be relied up to provide an indication that the task is complete or confirm other received data (either sensor data or user input) indicating that the task is complete. In some examples, the contractor or service provider may be a service provider recommended by or associated with the entity implementing the system. Once the user is finished, he or she may select "OK" option 714.

In other examples, confirmation of the completed work may also be provided by visual or other documentation transmitted to the entity. For instance, the user may take a photograph or video of the repaired or replaced system or device. The photo or video may be captured with a user computing device (such as a smart phone, tablet, or the like) and may be transmitted or uploaded to the system. In other examples, an image of a receipt from a contractor or other service provider may be used to confirm that a task has been completed. The receipt may be photographed (e.g., by the computing device of the user) and the image transmitted to the entity.

Figure 8:
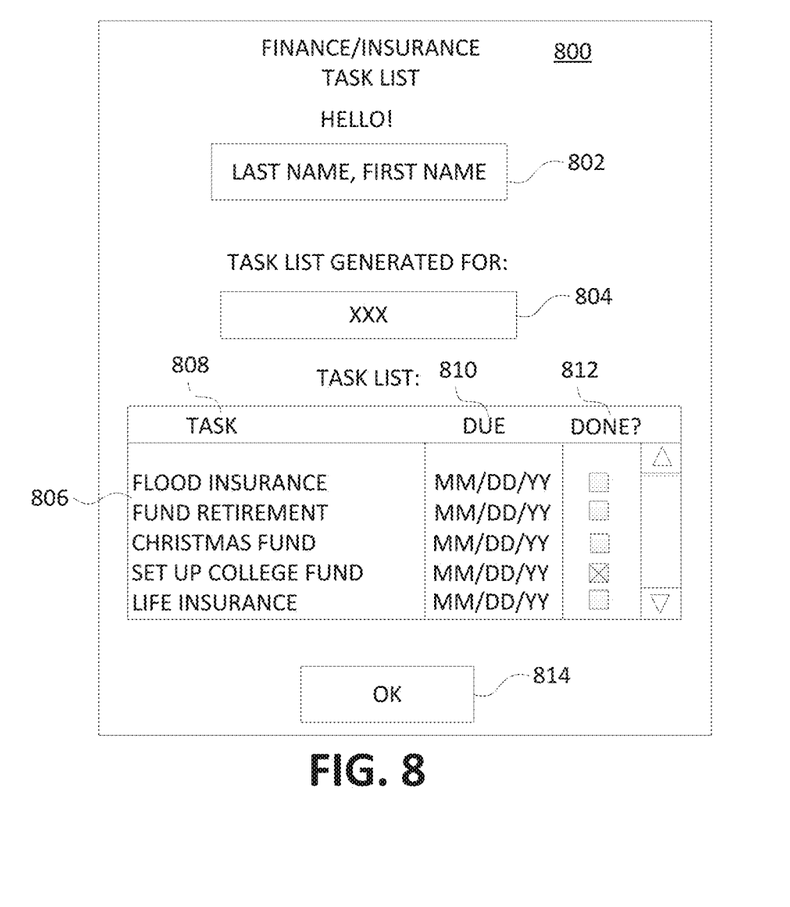
FIG. 8 is an example user interface for displaying example finance/insurance list, according to one or more aspects of the disclosure.

FIG. 8 illustrates one example user interface displaying a generated finance/insurance task list according to one or more examples discussed herein. The user interface 800 includes field 802 in which a user is identified, and field 804, in which the persons or family associated with the finance/insurance task list is identified.

Interface 800 further includes the generated task list in field 806. The task list includes a column identifying tasks generated for the particular person or family in column 808. Column 810 provides a recommended completion date (e.g., if completed by recommended date rewards and/or points may be generated for the user). Column 812 includes an identification of whether the task has been completed. For instance, task list 806 indicates that a college plan has been set up. Completion of the task may be determined by third party and/or user input, as discussed herein. Once the user is finished, he or she may select "OK" option 814.

In other examples, confirmation of the completed work may also be provided by visual or other documentation transmitted to the entity. For instance, the user may forward a copy of the college plan set up.

As discussed herein, completed tasks may generate points and/or rewards which may be used to obtain discounts or incentives. For instance, rewards may include a discount on an insurance premium, a reduction or discount on an insurance deductible, and the like. Additionally or alternatively, the points may be converted to funds that may be used to make a payment on an insurance premium or may be used toward an insurance deductible. For instance, a certain number of points may equate to $25 dollars that may be used toward payment of a premium or to reduce a deductible.

In another example, the points may be converted to funds that may be used toward payment of a contractor or other service provider performing maintenance on the home. For instance, a user may convert a portion of the earned points to cash that can be redeemed when paying the contractor or service provider. In some examples, if the service provider is associated with the entity, the user may use points as a method of payment.

In some arrangements, completion of one or more maintenance tasks on a task list may result in additional tasks being generated. For instance, as tasks are completed, more tasks may be generated, such that an ongoing task list may be continuously generated in order to maintain the home, thereby providing users with additional opportunities to earn points and/or additional rewards. In other examples, a new or updated task list may be generated a predefined intervals (e.g., upon completion of two tasks, upon completion of a certain percentage of the number of current tasks, etc.) or at predefined times (e.g., every month, every 3 months, every 6 months, etc.). Accordingly, the task list may be updated often in order to ensure that the home is being maintained according to recommendations.

The following is one example implementation of the home custom services system described herein. It is intended as one example and should not be viewed as limiting the system or arrangements discussed herein. Rather, various other implementations are available without departing from the invention.

In one example, a user may have had a spouse deployed overseas. The user is looking for help maintaining a home. The user provides status information to a home owner's insurance provider. The insurance provider may identify pre-identified categories based on the user status. The insurance provider may generate a custom interface based on the user status and pre-defined categories to obtain additional information from the user with the systems and arrangements discussed herein. Accordingly, the user may set up a maintenance account. Once the account is established, the system may receive information associated with the home and various systems and devices of the home. For instance, based on the insurance information, as well as other publicly available information, the system may determine that the house includes a roof, an HVAC system, plumbing systems, as well as devices such as a washer, dryer, dishwasher, water heater, and the like. In some examples, the systems and devices may be extracted from insurance information associated with the home. In other examples, the systems and devices may be received via user input.

Additional information associated with the identified systems and devices may also be received. For instance, an age of various systems or devices may be received, materials used in building the systems, age of the home, and the like, may be received (e.g., via insurance information, user input, etc.). Accordingly, the system may generate a maintenance task list that, based on the systems and devices within the home, as well as the additional information received about the systems and devices, includes maintenance tasks recommended for completion. The system may also generate a recommended completion date. In this example, the home may have a new roof, a 15 year old water heater, uneven sidewalks, and relatively new appliances. Accordingly, the system may generate a task list that includes replacing the water heater and repairing or replacing the sidewalks. The generated maintenance task list would be advantageous because it may be based on aggregated data from thousands or possibly hundreds of thousands of similar systems, devices, etc., maintenance performed thereon, performance data, insurance claim data, or the like. That is, the aggregated data may be used to determine which maintenance tasks should be performed for the specific systems and devices of the home, based on historical data of other similar systems and devices. Creation of such a task list is performed via the special purpose computing devices described herein.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A home services system server, comprising:
   one or more processors; and memory storing computer-readable instructions that, when executed by the one or more processors, cause the home services system server to:
receive status information of a user wherein the status information comprises at least one or more of marital status, military status, age status, medical status, retirement status, and offspring status;
identify at least one pre-defined category based on status information;
create a custom user interface based on the status of the user and the at least one pre-defined category for communication with the user to input information, wherein the custom user interface displays questions based on the status and at least one pre-defined category;
receive first data obtained from the user through the custom user interface;
receive second data associated with the home including information associated with at least one of an evaluation of the home, financial information of the user, and insurance information of the user;
based on the received first data and the received second data, generate a template of items associated with the user to be monitored or performed, wherein the template of items associated with the user to be monitored or performed includes:
a custom maintenance task list for the home, the maintenance task list including a plurality of maintenance tasks to be performed on the home, and
at least one of the following:
a custom financial task list for the user, the financial task list including a plurality of financial tasks to be accomplished, and
a custom insurance task list for the user, the insurance task list including a plurality of insurance tasks to be purchased; and
transmit the template of items to the user or third party associate with the user of the home.

2. The system of claim 1, wherein the computer readable instructions, when executed, further cause the server to:
receive data associated with maintenance performed on the home, the data associated with the maintenance including data associated with one or more tasks on the maintenance task list;
determine, based on the received data associated with maintenance performed on the home, whether at least one task on the maintenance task list has been completed; and
responsive to determining that the at least one task has been completed, marking the task complete on the maintenance task list.

3. The system of claim 2, wherein the received second data associated with an evaluation of the home further includes data received from sensors placed in the home.

4. The system of claim 2, wherein the received second data associated with an evaluation of the home further includes data received from an insurance provider and associated with structure of the home.

5. The system of claim 2, wherein the received second data associated with an evaluation of the home further includes publicly available information associated with the location in which the home is located.

6. The system of claim 1, wherein the computer readable instructions, when executed, further cause the server to:
receive data associated with one or more tasks on the financial task list;
determine, based on the received data whether at least one task on the financial task list has been completed;
responsive to determining that the at least one task has been completed, marking the task complete on the financial task list.

7. The system of claim 1, wherein the computer readable instructions, when executed, further cause the server to:
receive data associated with one or more tasks on the insurance task list;
determine, based on the received data whether at least one task on the insurance task list has been completed;
responsive to determining that the at least one task has been completed, marking the task complete on the insurance task list.

8. The system of claim 1 wherein the computer readable instructions, when executed, further cause the server to generate a custom appliance or equipment list for the home for replacement or upgrades.

9. The system of claim 1 wherein the computer readable instructions, when executed, further cause the server to generate a custom service provider list.

10. A method comprising:
receiving, by a home services system server, status information of a user, wherein the status information comprises at least one or more of marital status, military status, age status, medical status, retirement status, and offspring status;
determining, by the server, a category of user based on status information;
creating a custom user interface based on the category of the user, for communication with the user to input information, wherein the custom user interface displays questions based on the category and status information;
receiving first data associated obtained from the user through the custom user interface;
receiving second data associated with the home including information associated with an evaluation of the home;
generating, based on the received first data and the received second data, a template of items associated with the structure of the home to be monitored or performed, wherein the template of items associated with the structure to be monitored or performed include:
a custom maintenance task list for the home, the maintenance task list including a plurality of maintenance tasks to be performed on the home, and
at least one of the following:
a custom appliance or equipment list for the home for replacement or upgrades, and
a custom service provider list; and
transmitting the template of items to user of a home or third party associated with the user of the home.

11. The method of claim 10, further comprising
receiving data associated with maintenance performed on the home, the data associated with the maintenance including data associated with one or more tasks on the maintenance task list;
determining, based on the received data associated with maintenance performed on the home, whether at least one task on the maintenance task list has been completed; and
marking the task complete on the maintenance task list in response to determining that the at least one task has been completed.

12. The method of claim 11, wherein the received second data associated with an evaluation of the home further includes data received from sensors placed in the home.

13. The method of claim 11, wherein the received second data associated with an evaluation of the home further includes data received from an insurance provider and associated with the structure.

14. The method of claim 11, wherein the received second data associated with an evaluation of the home further includes publicly available information associated with the location in which the structure is located.

15. The method of claim 10, further comprising:
receiving data associated with one or more tasks on a financial task list;
determining, based on the received data whether at least one task on the financial task list has been completed; and
marking the task complete on the financial task list in response to determining that the at least one task has been completed.

16. The method of claim 10, further comprising:
receiving data associated with one or more tasks on an insurance task list;
determining, based on the received data whether at least one task on the insurance task list has been completed;
marking the task complete on the insurance task list in response to determining that the at least one task has been completed.

17. The method of claim 10, further comprising generating a custom appliance or equipment list for the home for replacement or upgrades.

18. The method of claim 10, further comprising generating a custom service provider list.

19. One or more non-transitory computer readable storage media comprising computer readable instructions that, when executed by a processor, configure a system to perform:

receiving, by a home services system server, status information of a user, wherein the status information comprises at least one or more of marital status, military status, age status, medical status, retirement status, and offspring status;
determining, by the server, a category of user based on status information;
creating a custom user interface for communication with the user to input information, based on the category of the user, wherein the custom user interface displays questions based on the category and status information;
receiving first data associated obtained from the user through the user interface;
receiving second data associated with the home including information associated with an evaluation of the home;
generating, based on the received first data and the received second data, a template of items associated with the structure of the home to be monitored or performed, wherein the template of items associated with the structure to be monitored or performed include:
a custom maintenance task list for the home, the maintenance task list including a plurality of maintenance tasks to be performed on the home, and
at least one of the following:
  a custom appliance or equipment list for the home for replacement or upgrades, and
  a custom service provider list; and
    transmitting the template of items to user of a home or third party associated with the user of the home.

* * * * *